United States Patent [19]
Borlinghaus et al.

[11] Patent Number: 5,226,697
[45] Date of Patent: Jul. 13, 1993

[54] SEAT BELT ANCHOR FOR VEHICLE SEAT

[75] Inventors: Hans J. Borlinghaus; Gary R. Kurtti; Thomas B. Blake, all of Mt. Clemens, Mich.

[73] Assignee: General Motors Corporation, Detroit, Mich.

[21] Appl. No.: 565,011

[22] Filed: Aug. 10, 1990

[51] Int. Cl.⁵ .................................. B60R 22/22
[52] U.S. Cl. .......................... 297/216; 297/473
[58] Field of Search ........................ 297/216, 473

[56] References Cited

U.S. PATENT DOCUMENTS

| | | | |
|---|---|---|---|
| 3,507,472 | 4/1970 | Agee et al. | 297/216 |
| 3,524,677 | 8/1970 | Louton, Jr. | 297/216 |
| 3,531,154 | 9/1970 | Fleche | 297/216 |
| 4,676,556 | 6/1987 | Yamanoi et al. | 297/473 |

Primary Examiner—Peter R. Brown
Attorney, Agent, or Firm—Charles E. Leahy

[57] ABSTRACT

A seat adjuster has upper and lower tracks slidably inter-engaged with the seat carried by the upper track. A bar extends along side the upper track and has a rearward end pivotally mounted on the vehicle floor. A lock member which carries the seat belt is attached to the upper track and slides freely along the bar during normal fore and aft adjusting movement of the seat. The lower track is mounted on the vehicle floor by yieldable legs. Upon rapid vehicle deceleration, the forward momentum of the seat mass induces yielding of the yieldable legs and forward canting of the seat causing the lock member to be canted relative the bar and lock therewith so that the occupant restraint loads imposed on the seat belt are transmitted through the lock member and bar to the vehicle floor. In addition, when the seat is adjusted full rearwardly, the upper track is cantilevered rearwardly from the lower track so that the upper track yields and bends to further cant the lock member and contribute to the locking engagement of the lock member with the bar.

4 Claims, 3 Drawing Sheets

SEAT BELT ANCHOR FOR VEHICLE SEAT

The invention relates to a vehicle seat and more particularly a mechanism by which the seat belt anchorage adjusts fore and aft with the seat and locks to transmit seat belt loads to the vehicle floor.

BACKGROUND OF THE INVENTION

The prior art has recognized the desirability of mounting a seat belt buckle on the vehicle seat so that the buckle adjusts fore and aft with the seat to remain at a consistent location aside the occupant torso. The prior art has also recognized the desirability of providing a load transfer mechanism by which the occupant restraint load imposed on the seat belt is transmitted directly to the vehicle floor without loading the seat adjuster mechanism.

The aforedescribed belt load transfer mechanism conventionally includes a toothed bar which extends along side the seat and has a rearward end pivotally mounted on the vehicle floor rearward of the seat. A locking mechanism normally slides along the bar and moves into a locking relationship with the bar upon the imposition of an occupant restraint load on the seat belt.

It would be desirable to provide a load transfer mechanism which would lock up prior to the onset of the occupant restraint load on the seat belt.

SUMMARY OF THE INVENTION

According to the invention, a seat adjuster has upper and lower tracks slidably inter-engaged with the seat carried by the upper track. A bar extends along side the upper track and has a rearward end pivotally mounted on the vehicle floor. A lock member which carries the seat belt is attached to the upper track and slides freely along the bar during normal fore and aft adjusting movement of the seat. The lower track is mounted on the vehicle floor by yieldable legs. Upon rapid vehicle deceleration, the forward momentum of the seat mass induces yielding of the yieldable legs and forward canting of the seat causing the lock member to be canted relative the bar and lock therewith so that the occupant restraint loads imposed on the seat belt are transmitted through the lock member and bar to the vehicle floor. In addition, when the seat is adjusted full rearwardly, the upper track is cantilevered rearwardly from the lower track so that the upper track yields and bends to further cant the lock member and contribute to the locking engagement of the lock member with the bar.

Accordingly, the object, feature, and advantage of the invention resides in the provision of a locking load transfer mechanism including a lock member carried by the upper track of a seat adjuster mounted on the vehicle floor by yieldable legs so that yielding of the legs cants the seat to carry the lock member into locking engagement with a load transfer bar prior to the onset of an occupant restraint load which would otherwise engage the lock member with the load transfer bar.

A further feature, object and advantage of the invention resides in the provision of an upper track cantilevered rearwardly of a lower track and having a load transfer lock member carried by the upper track so that upward bending and yielding of the upper track by the forward momentum of the seat cants the lock member into locking engagement with the transfer bar extending along side the seat.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
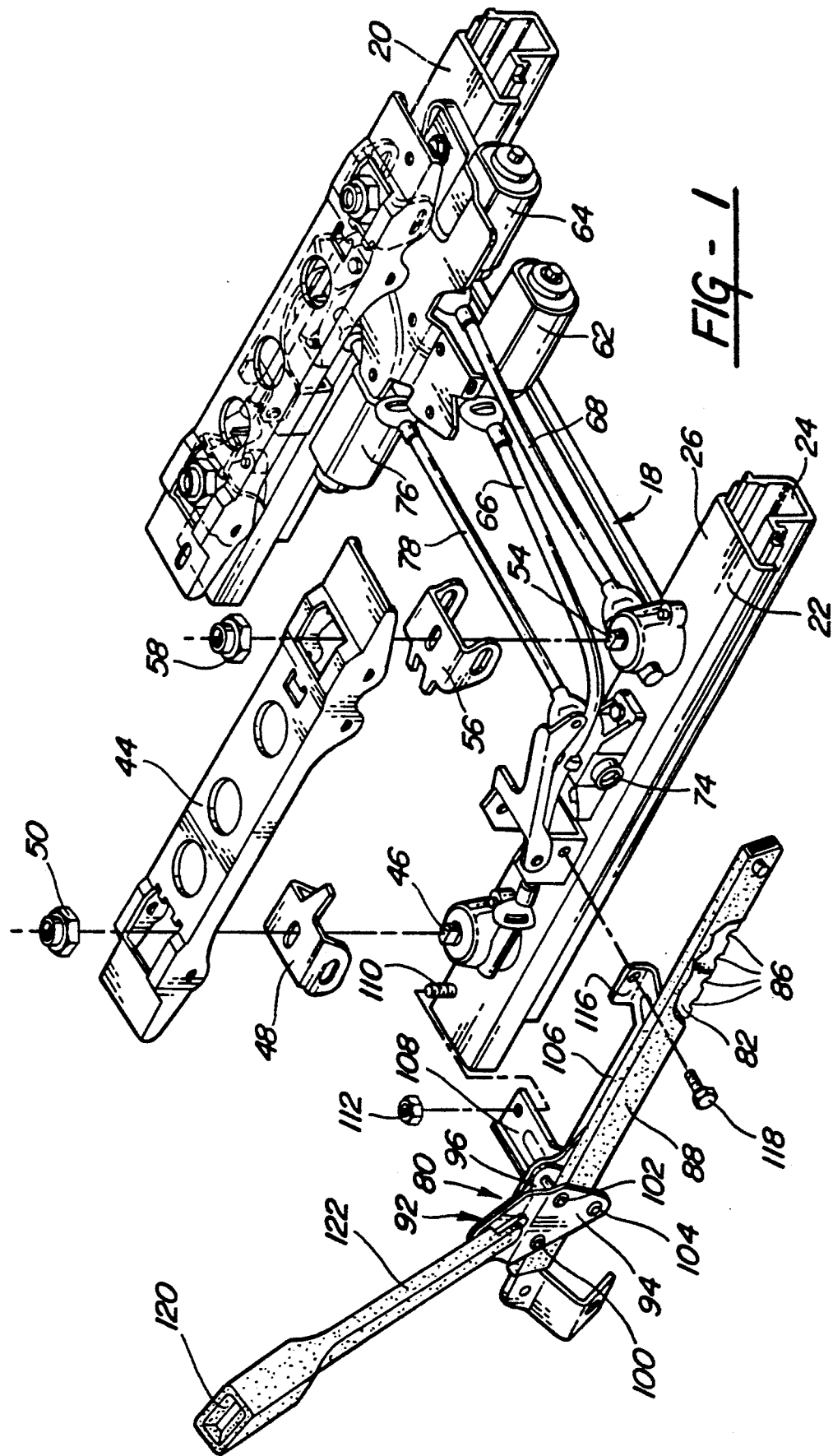
FIG. 1 is a perspective view of a vehicle seat and seat belt lead transfer mechanism.
Figure 2:
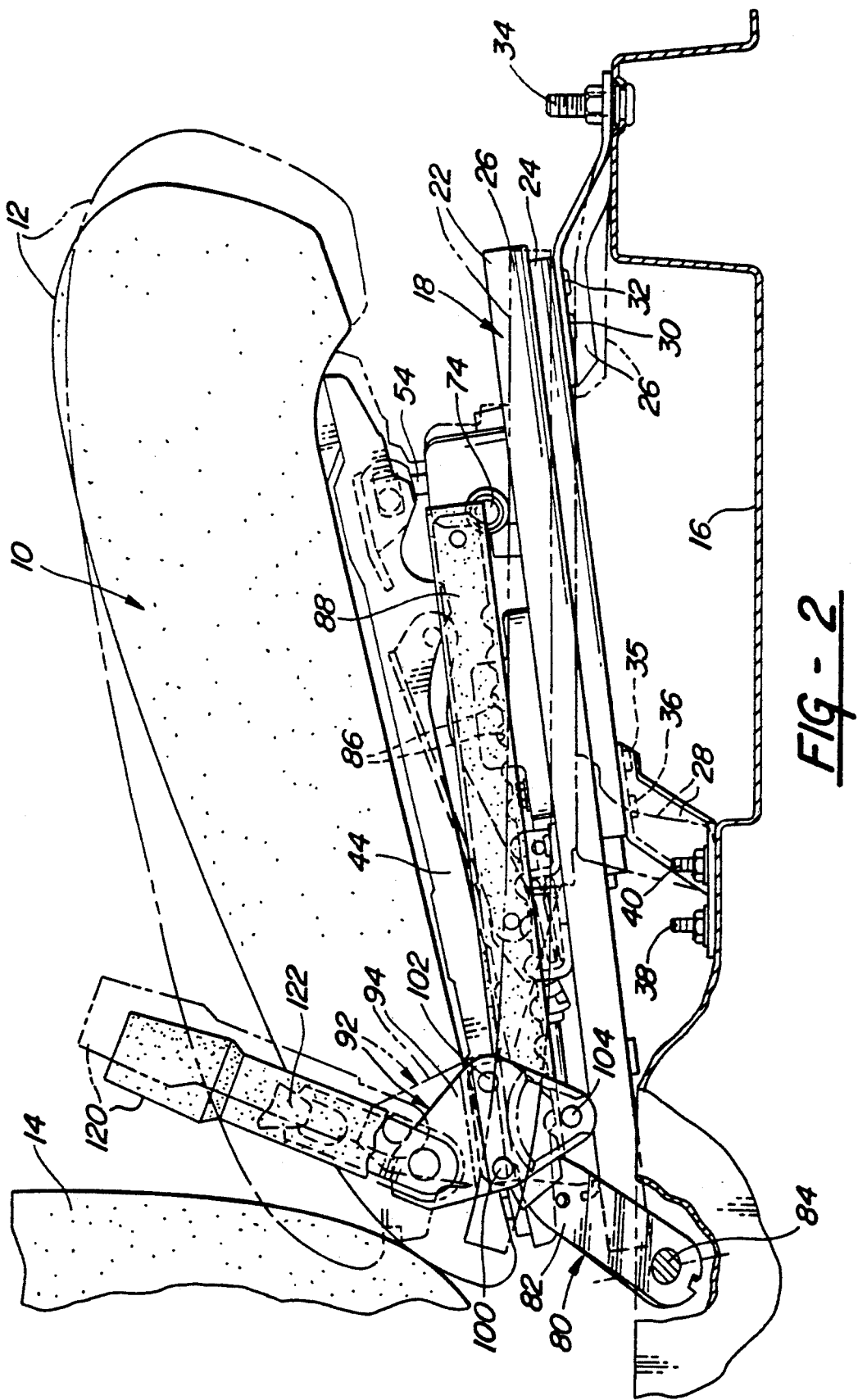
FIG. 2 is a side elevation view of the seat adjuster and load transfer mechanism.

Referring to FIGS. 1 and 2, it is seen that a vehicle seat 10 including a seat bottom 12 and a seat back 14 are adjustably mounted on a vehicle floor 16 by a seat adjuster assembly generally indicated at 18. As seen in FIG. 1, the seat adjuster assembly 18 includes a left-hand track assembly 20 and a right-hand track assembly 22 which are laterally spaced apart and similarly constructed. The track assembly 12 includes a lower track 24 and a upper track 26 which are slidably inter-engaged together. The lower track 24 is mounted on the vehicle floor 16 by a front mounting leg 26 attached to the lower track 24 by rivets 30 and 32 and attached to the floor by a nut and bolt assembly 34. The rear end of the lower track 24 is mounted on the floor 16 by a mounting leg 28 having an upper end connected to the rear end of the track 24 by rivets 35 and 36 and a lower end connected to the floor nut and bolt assemblies 38 and 40.

As best seen in FIG. 1, the seat adjuster assembly 18 also includes a seat support bracket 44 which is connected to the upper track 26 be a rear vertical adjuster comprised of jackscrew 46, trunnion 48, and nut 50, and a front jackscrew assembly comprised of jackscrew 54, trunnion bracket 56, and nut 58. The jackscrews 46 and 54 are respectively operated by electric motors 62 and 64 connected thereto by drive cables 66 and 68. The electric motors 62 and 64 may be energized through conventional electrical switches to vertically adjust the seat 10.

The track assembly 22 includes a pinion assembly 74 including a rack and pinion, not shown, which act between the upper track 22 and lower track 24 to move the upper track 22 fore and aft upon energization of a drive motor 76 connected thereto by a drive cable 78.

A belt load anchor assembly, generally indicated at 80, is provided for transmitting seat belt loads to the vehicle floor. As best seen in FIGS. 1 and 2, and elongated bar 82 has a rearward end pivotally attached to the vehicle floor by a bolt 84. The bar 82 extends along side the seat and has a plurality of notches 86 spaced along the underside thereof. A molded plastic sleeve along the underside thereof. A molded plastic sleeve 88 encloses the bar 82. A locking assembly 92 straddle the bar 82 and includes an outer plate 94 and an inner plate 96 spaced on opposite sides of the bar 82. The plates 94 and 96 are connected together by upper rivets 100 and 102 which are located above the bar 82 and a lower rivet 104 which is located below the bar 82. The rivets 100 and 102 also extend through apertures in a carrier bracket 106 which has a rear leg 108 attached to the upper track by bolt 110 and nut 112 and a forward leg 116 attached to the upper track 22 by a bolt 118. As best seen in FIGS. 1 and 2, the seat belt buckle 120 is attached to the plates 94 and 96 by a suitable mounting strap 122.

Figure 3:
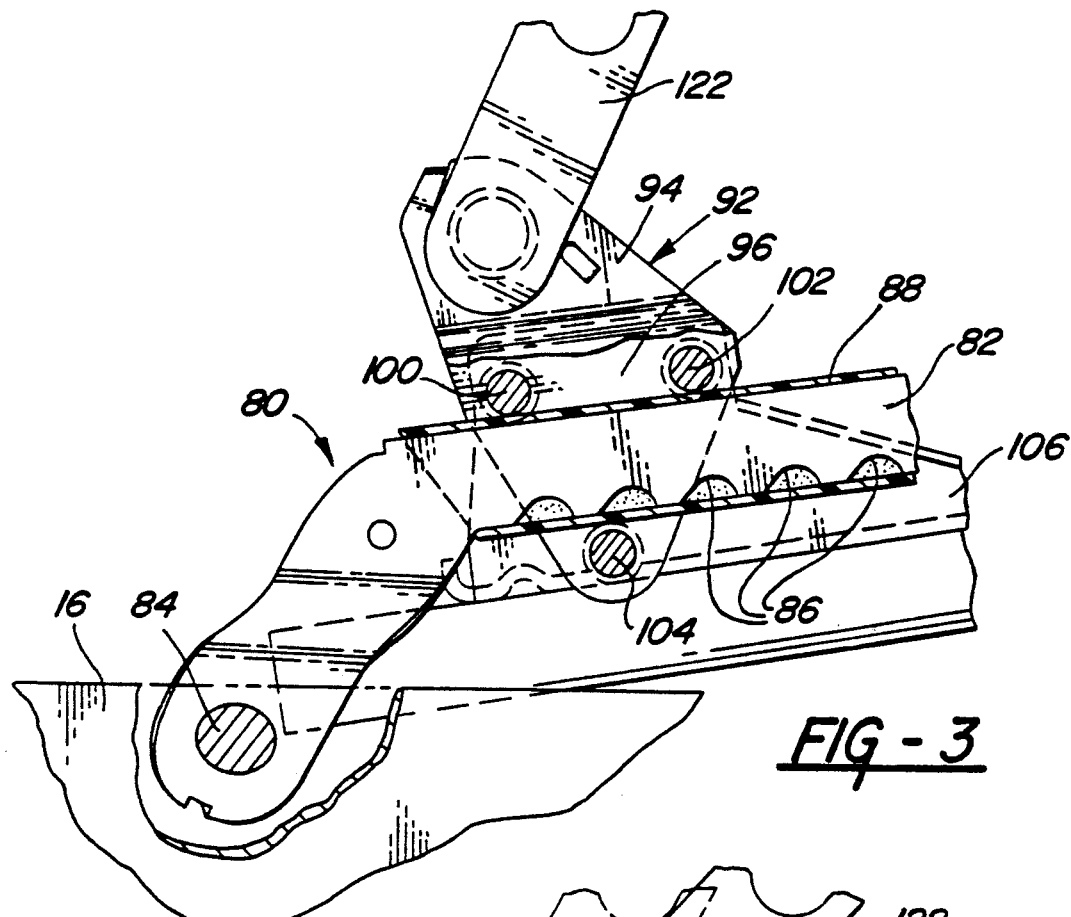
FIG. 3 is an enlarged fragmentary view of the load transfer mechanism shown in the unlocking condition permitting normal fore and aft adjustment of the vehicle seat.

As seen in FIG. 3, the carrier bracket 106 orients the locking assembly 92 with respect to the bar so that the upper rivets 100 and 102 rests atop the plastic sleeve 88 of bar 82 while the lower rivet 104 is spaced below the notches 86 of the bar 82. Accordingly, the locking assembly 92 slides freely along the bar 82 during the fore and aft adjusting movement of the upper track 26 along the lower track 24 under the control of the motor 76.

Figure 4:
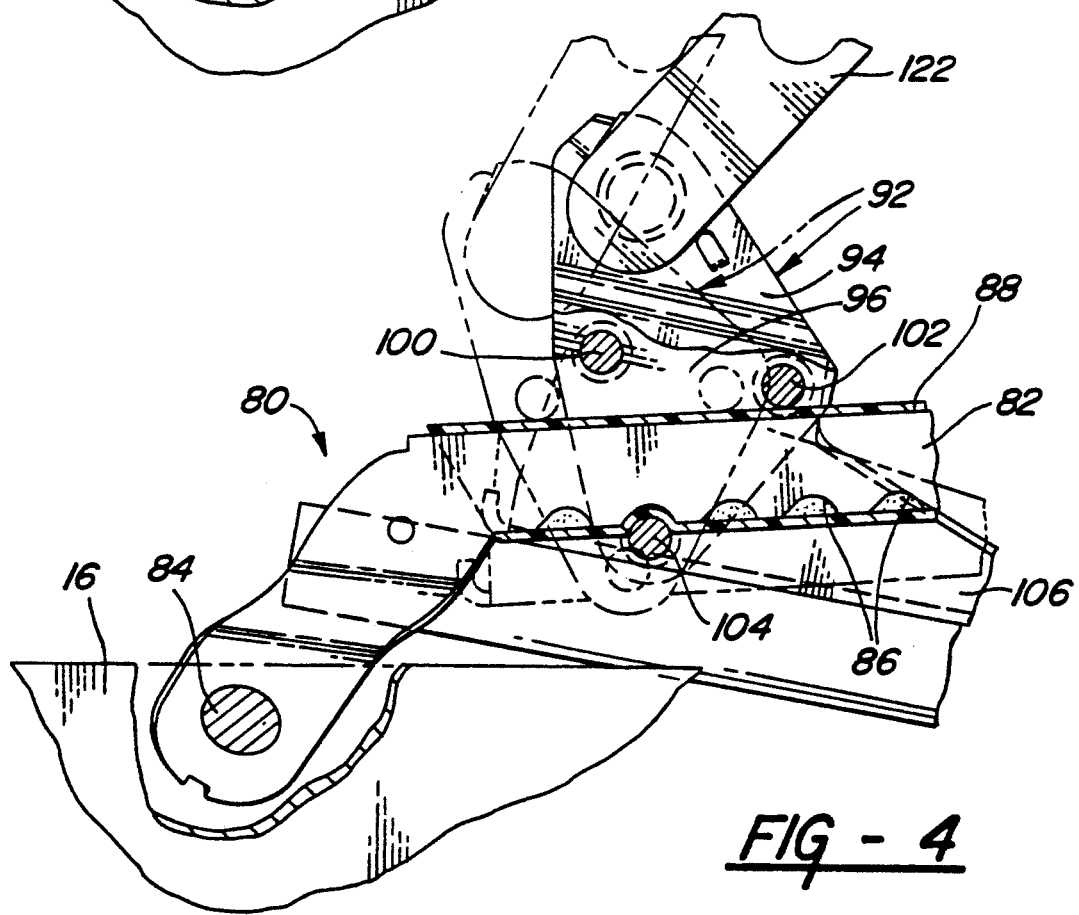
FIG. 4 is a view similar to FIG. 3 but showing the locking member having been moved into the locking position with respect to the load transfer bar by the canting of the seat.

In the event of rapid vehicle acceleration, the forward momentum of the substantial mass of vehicle seat 10 causes the seat 10 to pitch forward as permitted by yielding and bending of the front leg 26 in the downward collapsing direction and by the yielding and bending in the upward extending direction of the rear leg 28, as shown in phantom lines in FIG. 2. In addition, as shown in FIG. 2, when the seat is adjusted rearwardly, the upper track 22 overhangs the lower track 24 and is cantilevered rearwardly therefrom so that the upper track 22 yields and bends to the phantom line indicated position. Because the locking assembly 92 is rigidly connected to the upper track 22 by the carrier bracket 106 and rivets 100, 102, and 104, the locking assembly 92 is canted forwardly to the position of FIG. 4 in which the lower rivet 104 forcibly indents the plastic sleeve 88 into one of the notches 86 as the lock assembly is canted forwardly about the reaction point defined by the upper rivet 102. Accordingly, it will be understood that the engagement of the lower rivet 102 within one of the notches 86 will effectively lock the locking assembly 92 to the bar 82 and thereby establish a direct force transmitting connection between the seat belt buckle 120 and the vehicle floor 16 through the locking assembly 92 and the bar 82.

Accordingly, it will be appreciated that the substantial mass of the seat 10 itself will initiate lockup of the belt load transfer mechanism 80 prior to the lockup which would result when the occupant restraint load is imposed on the buckle 120 and acts to pivot the lock assembly forwardly about the rivet 102 as would be permitted by the bending of the carrier bracket 106. It will be understood that the onset of lockup of the belt load transfer mechanism 80 is determined by a number of variables including the mass of the seat, the stiffness and yieldability of the seat adjuster legs 26 and 28, the extent to which the upper track is cantilevered rearwardly of the lower track, stiffness of the plastic sleeve 88 and the dimensional relationship of the rivets 100, 102, and 104 relative to the toothed bar 82. The degree of flexure of the upper track 22 is exaggerated in FIGS. 2 and 3 for purpose of clarity.

The embodiments of the invention in which an exclusive property or privilege is claimed are defined as follows:

1. A seat belt anchoring device for a vehicle comprising:
   a seat adjuster having upper and lower tracks slidably inter-engaged,
   a seat carried by the upper track,
   a bar extending alongside the upper track and having a rearward end pivotally mounted on the vehicle,
   a lock member attached to the upper track and sliding freely along the bar during adjusting movement and locking with the bar upon canting movement of the lock member relative to the bar,
   a seat belt connected to the lock member,
   and legs yieldably connecting the lower track to the vehicle so that the forward momentum of the seat induces forward canting of the seat by yielding and bending of the legs during vehicle deceleration thereby causing the lock member attached to the upper track to be canted relative the bar so that the lock member locks with the bar to transmit loads imposed on the seat belt through the lock member and bar to the vehicle floor.

2. A seat belt anchoring device for a vehicle comprising:
   a seat adjuster having upper and lower tracks slidably inter-engaged,
   a seat carried by the upper track,
   a bar extending alongside the upper track and having a rearward end pivotally mounted on the vehicle,
   a lock member attached to the upper track and sliding freely along the bar during adjusting movement and locking with the bar upon canting movement of the lock member relative to the bar,
   a seat belt connected to the lock member, respectively yieldably connecting front and rear portions of the lower track to the vehicle so that the forward momentum of the seat induces downward collapsing yielding and bending of the front leg and upward extending yielding and bending of the rear legs thereby canting the seat relative the bar during vehicle deceleration and causing the lock member attached to the upper track to be canted relative the bar so that the lock member locks with the bar to transmit loads imposed on the seat belt through the lock member and bar to the vehicle floor.

3. A seat belt anchoring device for a vehicle comprising:
   a seat adjuster having an upper track carrying a vehicle seat and slidably inter-engaged with a lower track adapted for mounting on the vehicle floor, said upper track having a portion thereof cantilevered rearwardly from the lower track at least when the seat is adjusted rearwardly,
   a bar extending alongside the upper track and having a rearward end pivotally mounted on the vehicle,
   a lock member attached to the upper track and sliding freely along the bar during adjusting movement of the seat and locking with the bar upon canting movement of the lock member relative to the bar,
   a seat belt connected to the lock member,
   said cantilevered portion of the upper track yielding and bending in response to a moment of force imposed thereon by the forward momentum of the seat during vehicle deceleration so that the lock member attached to the upper track is canted relative the bar causing locking of the lock member with the bar to transmit loads imposed on the seat belt through the lock member and bar to the vehicle floor.

4. A seat belt anchoring device for a vehicle comprising:
   a seat adjuster having an upper track carrying a vehicle seat and slidably inter-engaged with a lower track, said upper track having a portion thereof cantilevered rearwardly from the lower track at least when the seat is adjusted rearwardly, yieldable legs connecting the lower track to the vehicle so that the forward momentum of the seat bends the legs and induces forward canting of the seat during vehicle deceleration, a bar extending alongside the upper track and having a rearward end pivotally mounted on the vehicle, a lock member attached to the upper track and sliding freely along the bar during adjusting movement and locking with the bar upon canting movement of the lock member relative to the bar, a seat belt connected to the lock member, said cantilevered portion of the upper track and said yieldable legs yielding and bending in response to a moment of force imposed thereon by the forward momentum of the seat during vehicle deceleration thereby causing the lock member attached to the upper track to be canted relative the bar so that the lock member locks with the bar to transmit loads imposed on the seat belt through the lock member and bar to the vehicle floor.

* * * * *